Figure 6:
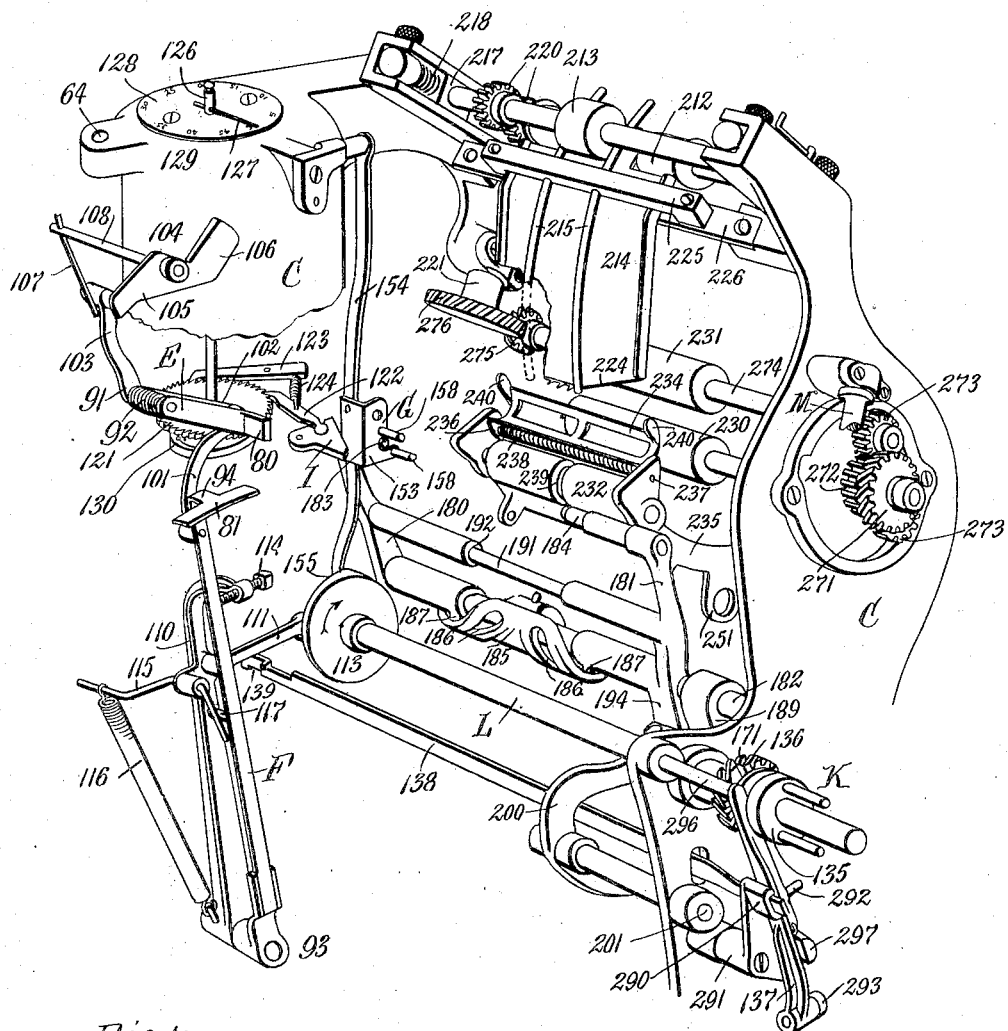

F. HART.
MACHINE FOR WRAPPING COINS.
APPLICATION FILED DEC. 18, 1907.
1,038,361.
Patented Sept. 10, 1912.
9 SHEETS—SHEET 1.
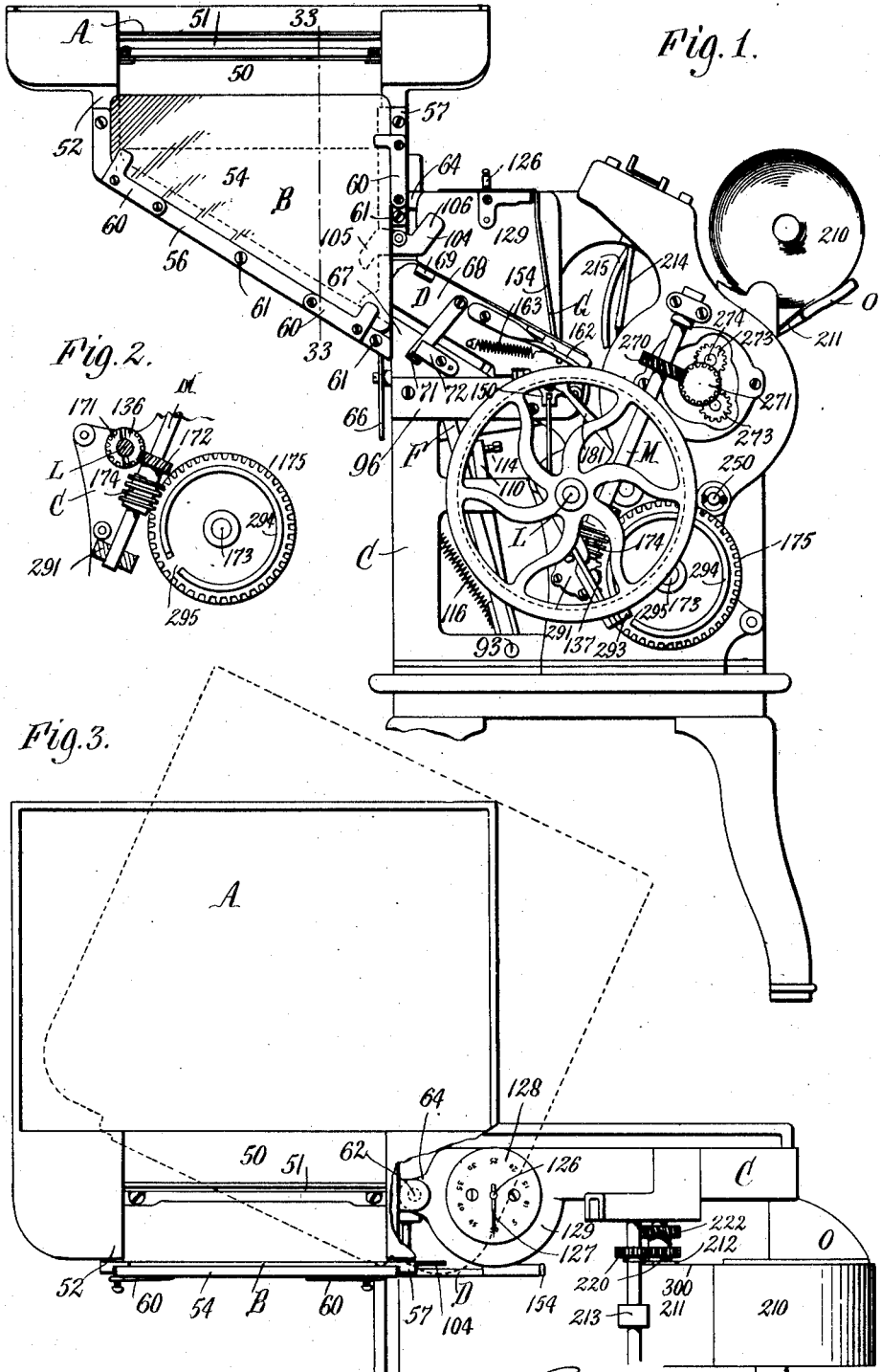

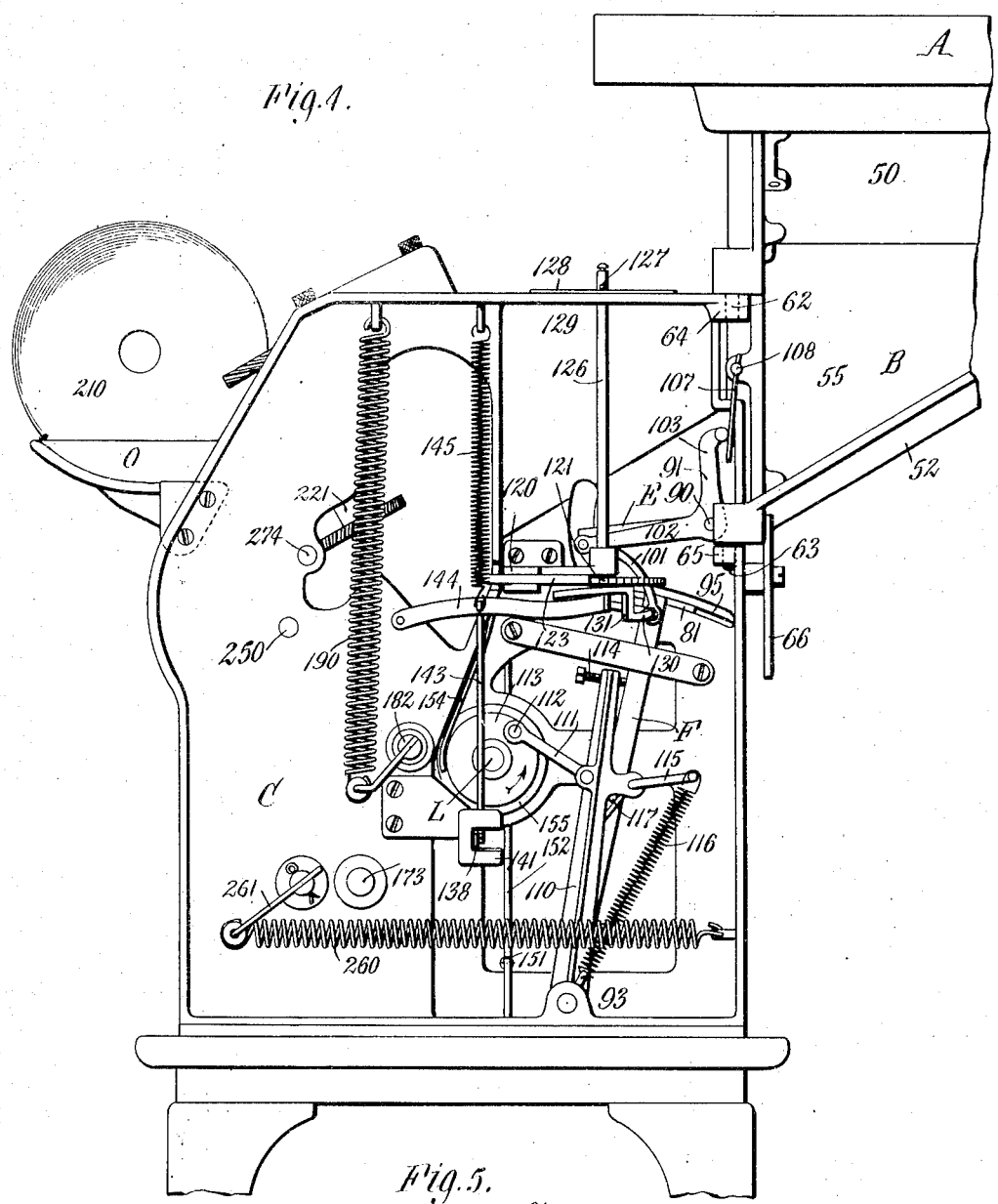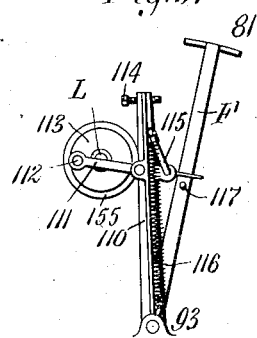

F. HART.
MACHINE FOR WRAPPING COINS.
APPLICATION FILED DEC. 18, 1907.

1,038,361.

Patented Sept. 10, 1912.

9 SHEETS—SHEET 3.

Witnesses:
E. A. Volk
A. G. Dimond

Inventor.
Frederick Hart
by
Wilhelm Parker Hart, Attorneys.

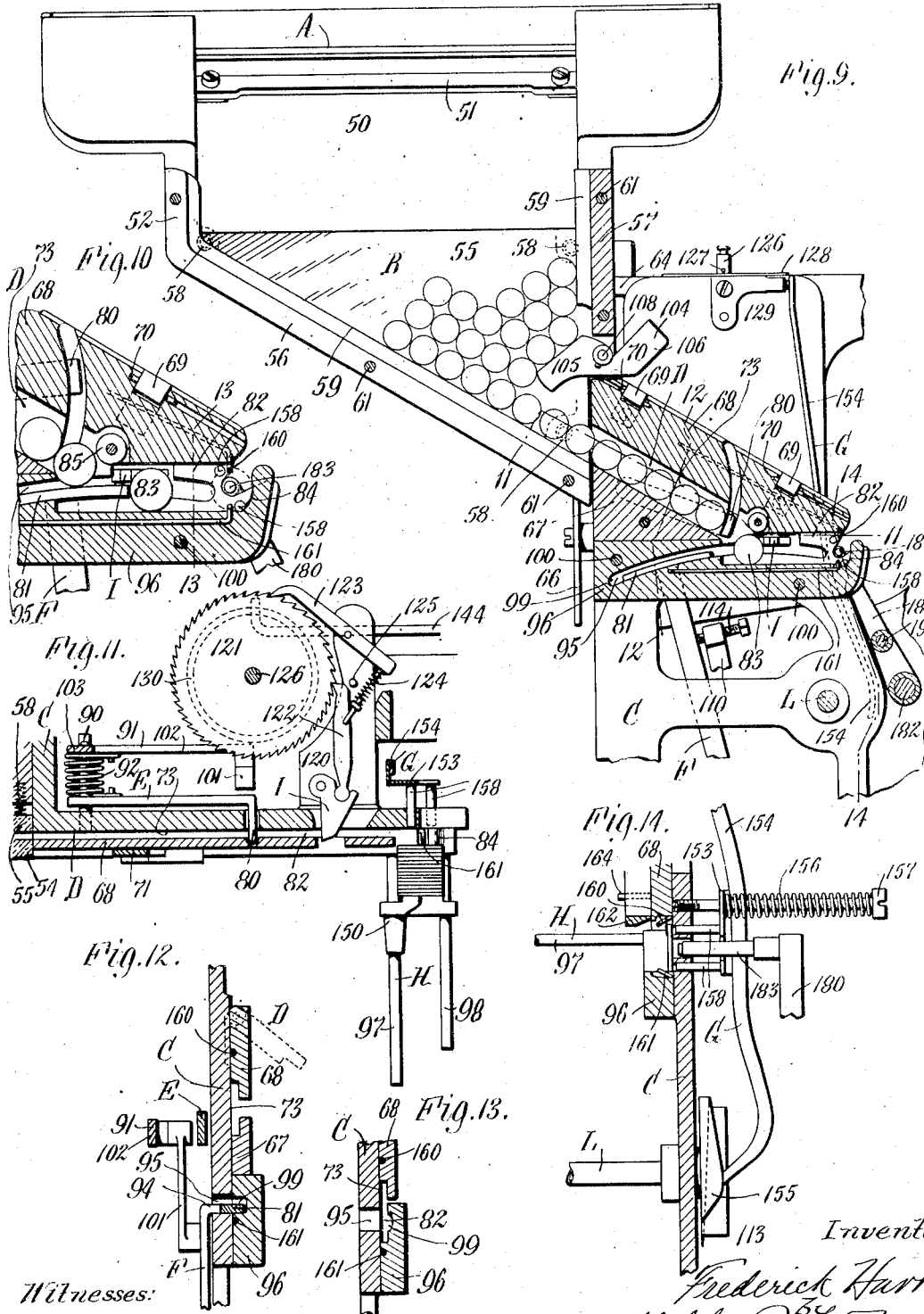

F. HART.
MACHINE FOR WRAPPING COINS.
APPLICATION FILED DEC. 18, 1907.
1,038,361.
Patented Sept. 10, 1912.
9 SHEETS—SHEET 5.
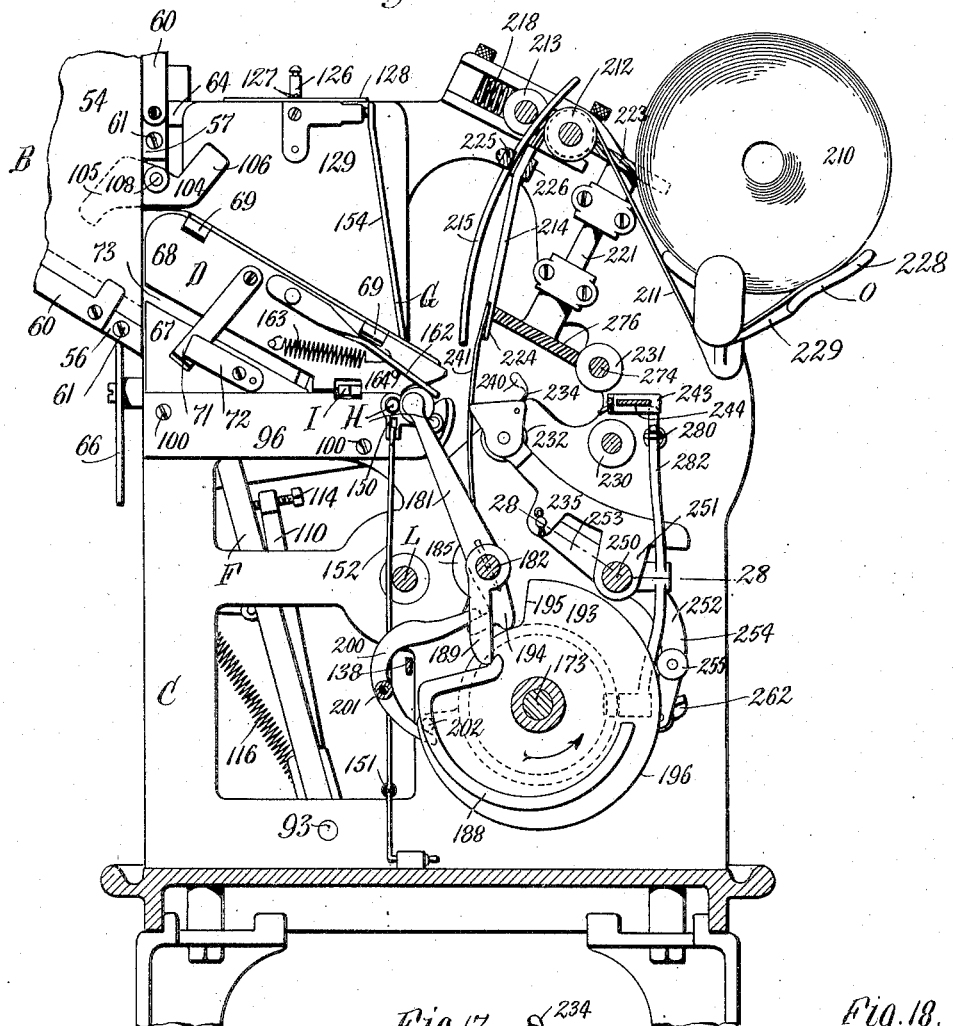
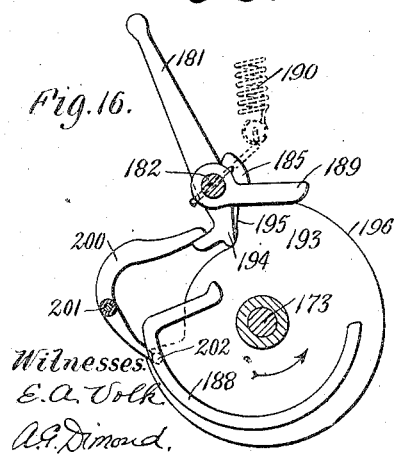
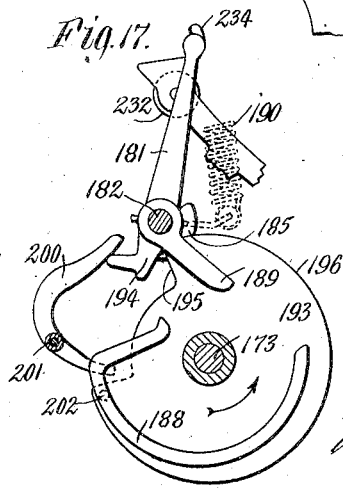
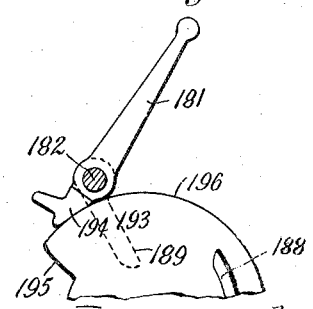
Witnesses
E. A. Volk
A. G. Dimond.
Inventor.
Frederick Hart
By Wilhelm, Parker & Hand
Attorneys

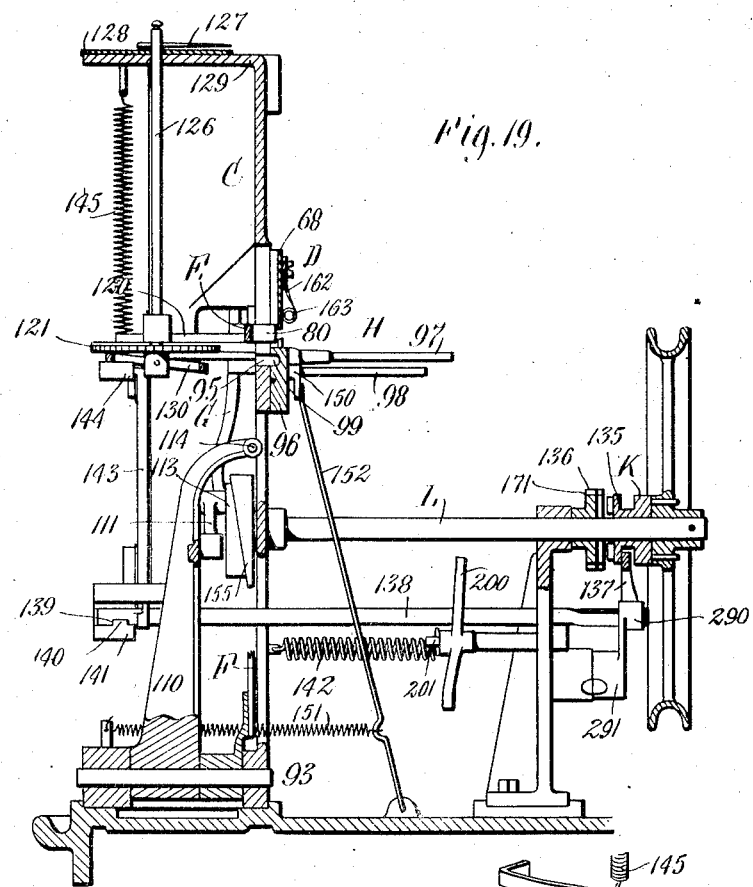
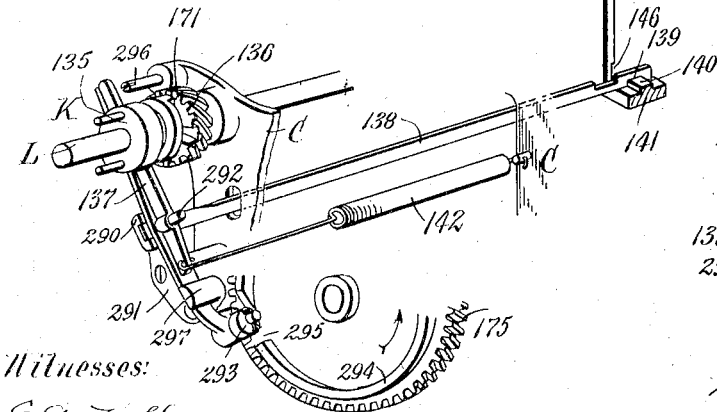
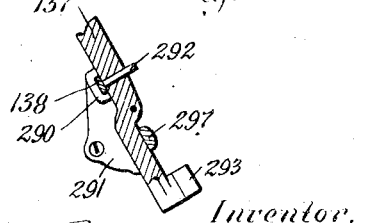

F. HART.
MACHINE FOR WRAPPING COINS.
APPLICATION FILED DEC. 18, 1907.
1,038,361.
Patented Sept. 10, 1912.
9 SHEETS—SHEET 7.
Fig. 23.
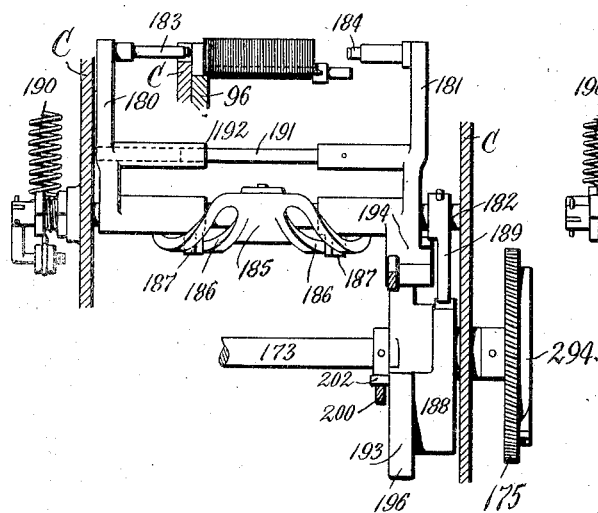
Fig. 24.
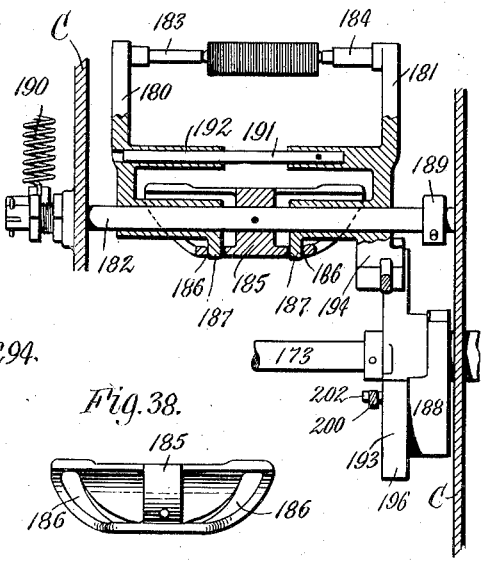
Fig. 38.
Fig. 25.
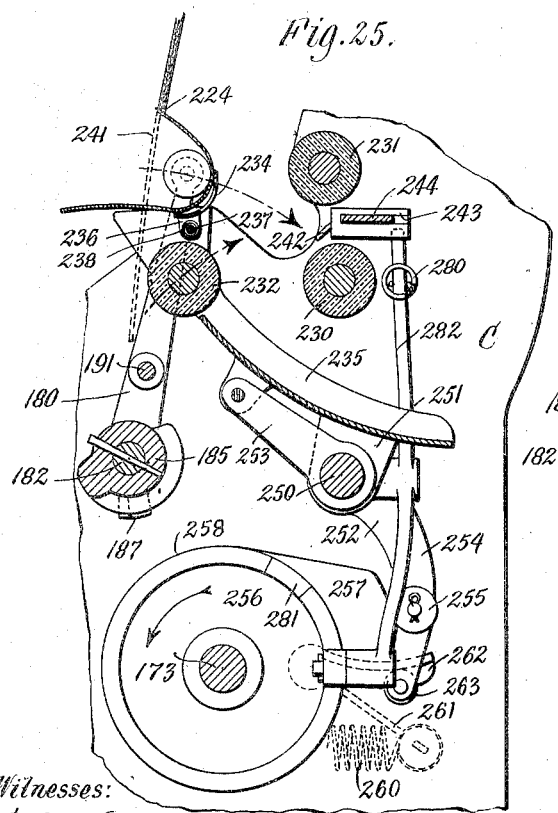
Fig. 26.
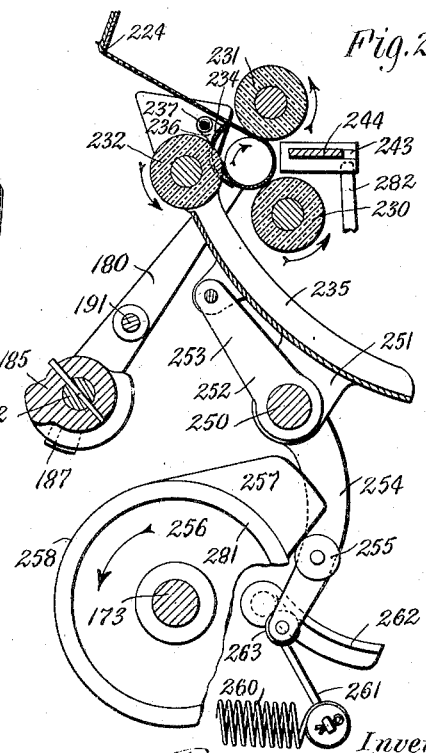
Witnesses:
E. A. Volk.
A. S. Dimond.
Inventor,
Frederick Hart
By
Wilhelm, Parker & Ward
Attorneys F. HART.
MACHINE FOR WRAPPING COINS.
APPLICATION FILED DEC. 18, 1907.
1,038,361.
Patented Sept. 10, 1912.
9 SHEETS—SHEET 8.
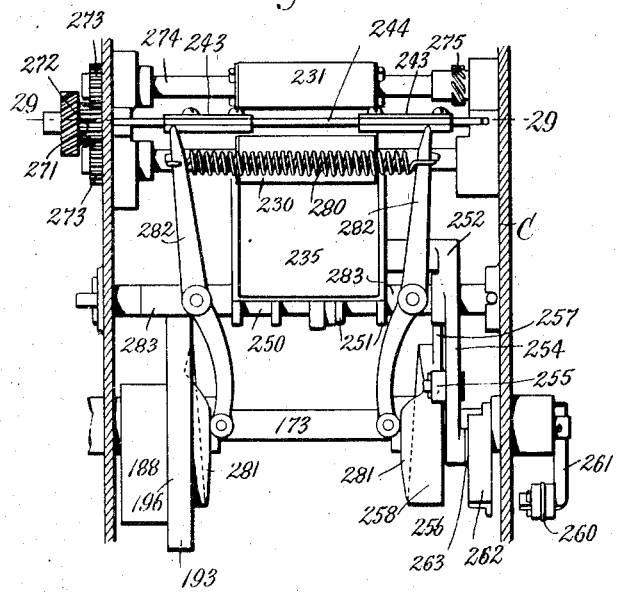
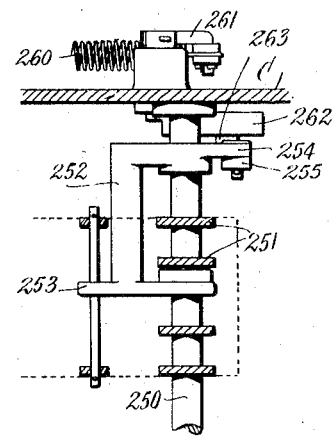
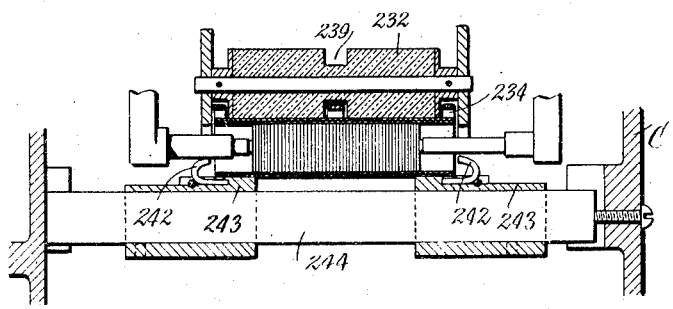
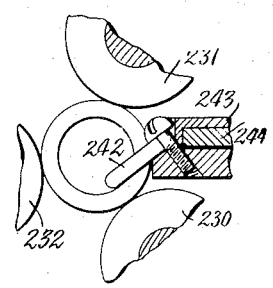
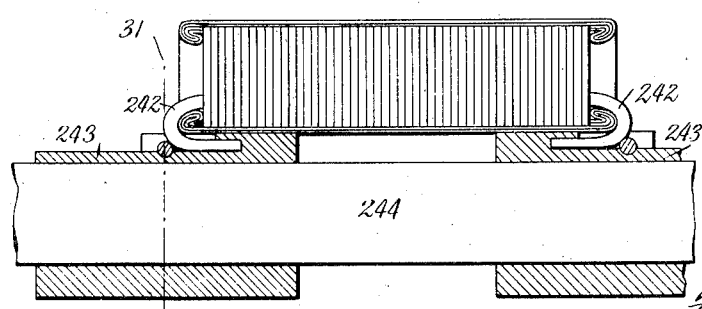
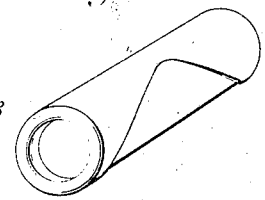
Witnesses:
E. A. Volk.
A. G. Dmond.
Inventor.
Frederick Hart
by
Wilhelm, Parker & Hard
Attorneys.

F. HART.
MACHINE FOR WRAPPING COINS.
APPLICATION FILED DEC. 18, 1907.
1,038,361.
Patented Sept. 10, 1912.
9 SHEETS—SHEET 9.
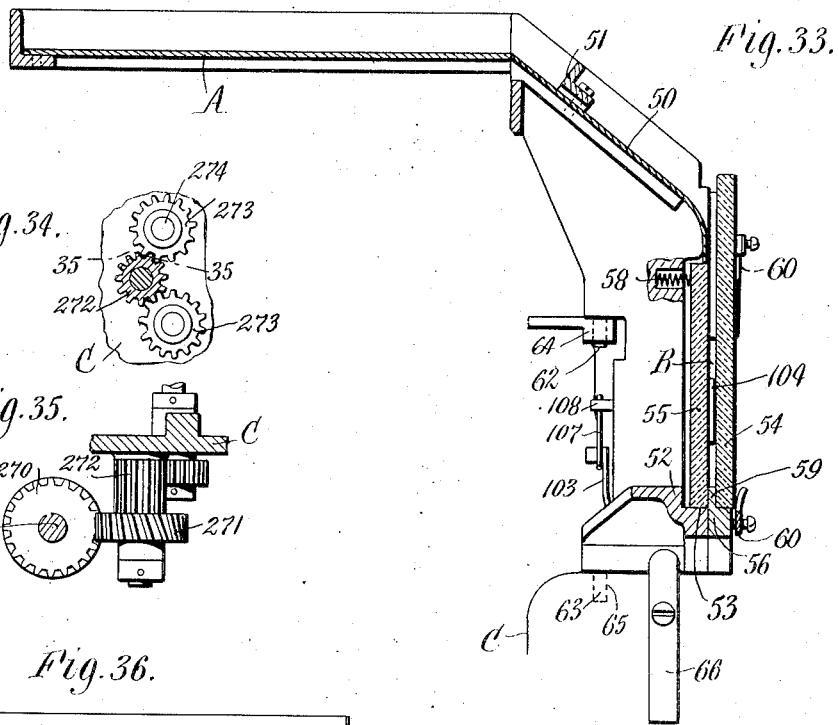
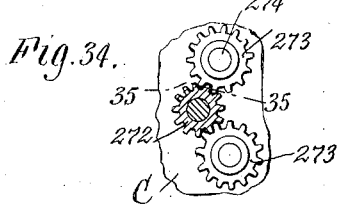
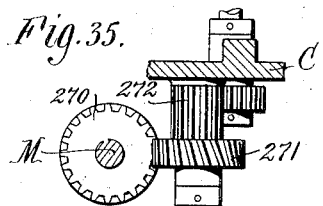
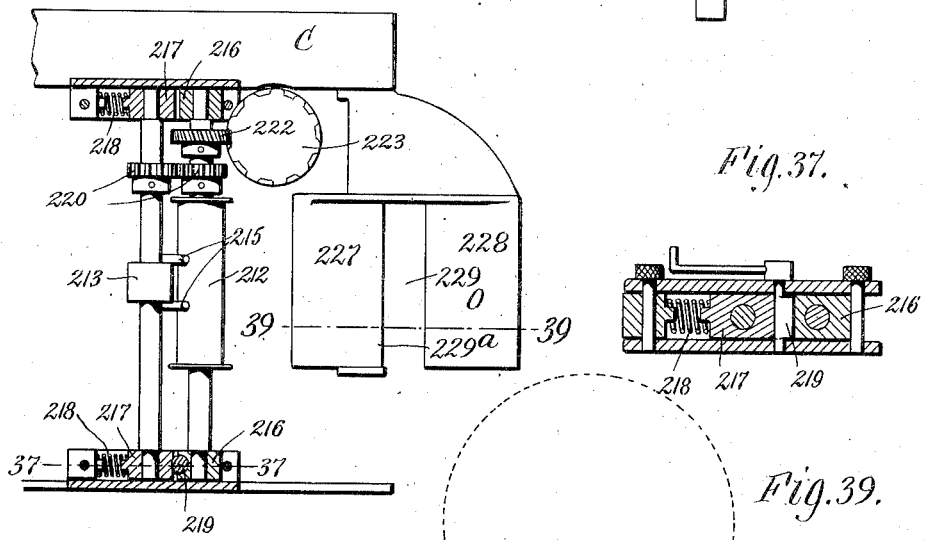
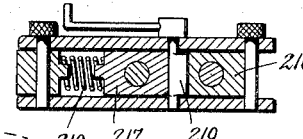
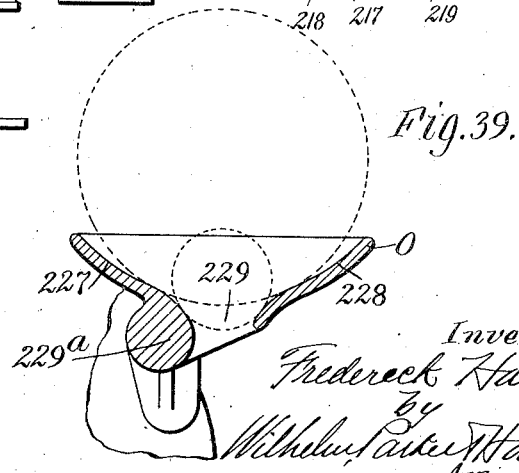

UNITED STATES PATENT OFFICE.

FREDERICK HART, OF POUGHKEEPSIE, NEW YORK.

MACHINE FOR WRAPPING COINS.

1,038,361.  Specification of Letters Patent.  Patented Sept. 10, 1912.

Application filed December 18, 1907. Serial No. 407,017.

*To all whom it may concern:*

Be it known that I, FREDERICK HART, a subject of the King of Great Britain, residing at Poughkeepsie, in the county of Dutchess and State of New York, have invented a new and useful Improvement in Machines for Wrapping Coins, of which the following is a specification.

This invention relates to a machine of the general type which is described and shown in Letters Patent No. 691,435, January 21, 1902, and No. 751,246, February 2, 1904. The machines of these patents comprise a table upon which the coins are placed for inspection, a hopper into which the coins are placed edgewise and which has a width equal to the thickness of one coin, a chute through which the coins pass from the hopper to the packer, a counting mechanism which is actuated by each coin as it passes to the packer, a cradle upon which the coins are assembled side by side in a bundle containing a predetermined number, a gripping mechanism which seizes the assembled bundle of coins and carries the same to the wrapping mechanism by which the paper wrapper fed out for each bundle is applied to the bundle of coins and wrapped around the same, and crimpers which curl over the end portions of the paper wrapper and close the same against the bundle of coins.

The object of this invention is to improve the packing and wrapping mechanisms with a view of rendering the construction and operation of the machine more reliable, exact, uniform and convenient.

Figure 7:
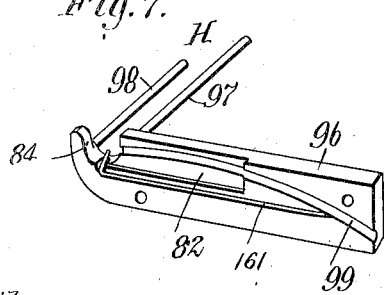
Figure 8:
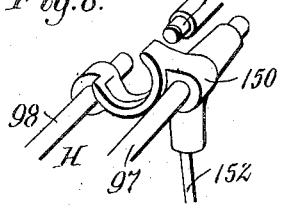

In the accompanying drawings, consisting of nine sheets: Figure 1 is a front elevation of the machine viewed from the driving side. Fig. 2 is an elevation of the lower portion of the oblique countershaft and connecting parts. Fig. 3 is a top plan view of the feed table and hopper and the portion of the machine adjacent thereto. Fig. 4 is a rear elevation of the machine, on an enlarged scale. Fig. 5 is a rear elevation of the feed lever and its actuating lever uncoupled, on a reduced scale. Fig. 6 is a fragmentary perspective view of the machine. Fig. 7 is a perspective view of the cover plate containing the packing chamber. Fig. 8 is a perspective view of the free end of the coin cradle and the sliding follower thereon, on an enlarged scale. Fig. 9 is a longitudinal sectional elevation of the coin hopper and coin chute, on an enlarged scale. Fig. 10 is a longitudinal sectional elevation of the packing chamber and adjacent portion of the coin chute, on a still larger scale. Fig. 11 is a horizontal section in line 11—11, Fig. 9. Fig. 12 is a vertical cross section in line 12—12, Fig. 9, on an enlarged scale. Fig. 13 is a vertical cross section in line 13—13, Fig. 10. Fig. 14 is a sectional elevation of the packer and connecting parts in line 14—14, Fig. 9, on an enlarged scale. Fig. 15 is a longitudinal sectional elevation of the machine, on the same scale as Fig. 4. Figs. 16, 17 and 18 are elevations showing the grippers in different positions. Fig. 19 is a transverse section of the machine, partly in the plane of the driving shaft and partly in the plane of the feed lever. Fig. 20 is a perspective view of the clutch mechanism. Fig. 21 is a perspective view of the lock of the clutch shifting rod and connecting parts. Fig. 22 is a sectional view of the lower portion of the clutch shifting lever. Fig. 23 is a transverse sectional elevation showing the grippers and connecting parts viewed from the front. Fig. 24 is a similar elevation showing the lower parts of the grippers in section. Figs. 25 and 26 are longitudinal sectional elevations showing the wrapping rolls and connecting parts in different positions. Fig. 27 is a transverse sectional elevation showing the crimpers viewed from the delivery end of the machine. Fig. 28 is a transverse section in line 28—28, Fig. 15. Fig. 29 is a horizontal section in line 29—29, Fig. 27. Fig. 30 is a longitudinal sectional elevation of the bundle and the crimpers operating thereon, on an enlarged scale. Fig. 31 is a sectional end elevation in line 31—31, Fig. 30. Fig. 32 is a perspective view of the finished wrapped bundle. Fig. 33 is a sectional elevation in line 33—33, Fig. 1. Fig. 34 is a sectional side elevation of the gears by which the wrapping rolls are driven. Fig. 35 is a horizontal section in line 35—35, Fig. 34. Fig. 36 is a sectional plan view of the paper feed rolls and connecting parts. Fig. 37 is a vertical section in line 37—37, Fig. 36, on an enlarged scale. Fig. 38 is a detached elevation of the duplex cam for operating the grippers. Fig. 39 is a vertical section in line 39—39, Fig. 36, on an enlarged scale.

Like reference characters refer to like parts in the several figures.

A represents the table upon which the coins are placed for inspection and from which the coins are pushed by the operator upon the inclined plate 50 over which extends the bridge 51 which intercepts bent coins. The coins slide down this inclined plate and drop edgewise into the coin hopper B. The width of this hopper is equal to the thickness of the particular denomination of coin which is supplied to the machine and the coins accumulate edgewise in the hopper.

The hopper, Figs. 1, 3, 4, 9 and 33, comprises a frame 52 having an inclined bottom 53, front and rear plates 54 55, preferably of glass, an inclined bottom bar 56 and an upright bar 57 at the delivery end of the hopper. The rear plate 55 rests upon the bottom 53 of the frame and is backed by spiral springs 58 which are seated in sockets in the frame and press the plate against the rear sides of spacing ribs 59 on the bottom bar 56 and upright bar 57. The front plate 54 rests upon the bottom bar 56 and against the upright bar 57 and is pressed against the front sides of the spacing ribs 59 by flat springs 60 which are secured to the bars 56 and 57. These bars are detachably secured to the frame by screws 61, or otherwise, so that they can be readily replaced by other bars having spacing ribs of different thicknesses when it is desired to change from one denomination of coin to another of different thickness. The springs enable the front and rear plates to adjust themselves to the thickness of the spacing ribs.

C represents the main frame of the machine upon which the several groups of mechanisms are mounted and which may be provided with supporting legs, as shown.

D represents the inclined coin chute which is arranged at the feed end of the machine and forms a continuation of the inclined bottom of the coin hopper. This chute is secured to the main frame, while the coin hopper is attached to said frame by vertical pivots so that it can be turned to a position at right angles to its normal working position when not required for use. This pivotal connection, which is best shown in Figs. 3 and 4, comprises upper and lower pivots 62 63 on the frame of the hopper entering sockets 64 65 on the main frame D. The upper pivot 62 is arranged at the top of the coin hopper, which is about on a level with the top of the main frame, while the lower pivot is arranged at the lower end of the coin hopper. This arrangement of the pivots furnishes a comparatively stiff pivotal support for the coin table and hopper and prevents a heavy load of coin on the table from tipping the table and hopper. It is important to prevent such tipping because, if it occurs, the deflection of the hopper out of its true position causes a shoulder or break in the inclined bottom or runway on which the coins run, where the bottom of the hopper joins that of the chute, and this is liable to stop the coins at the junction of the hopper and the chute.

The hopper is locked in its working position by a turn button 66, Figs. 1, 4 9, 15 and 33, or other suitable means, and the pivots are preferably so constructed that they can be lifted out of their sockets, when it is desired to detach the table and hopper from the main frame.

The coin chute comprises a lower part 67, Figs. 1, 9, 10, 12 and 15, which is rigidly secured to the main frame, and an upper part 68 which is pivotally attached to the main frame so that it can be swung up when access is required to the chute. This pivotal connection is preferably made by lugs 69 on the main frame and hinge pins 70 in the upper part of the chute. The hinged upper part of the chute is secured in its working position by a latch 71 on the upper part engaging a catch 72 on the lower part. Each part of the chute has a recessed runway through which the coins move edgewse along the flat face 73 of the main frame on which the two parts of the coin chute are arranged.

The row of coins lying in the chute is arrested by an escapement or lever E and the coins are released one after another by this lever and pushed by a feed lever F forwardly into the packing position, from which they are pushed by a packer G transversely or flatwise upon the cradle or support H on which the coins are assembled side by side into a roll or bundle. Each coin, as it is pushed into the packing position, moves the counting lever I one step and when the predetermined number of coins but one have been so assembled, the last coin fed forward, which completes the bundle, causes the final movement of the counting mechanism and this causes the engagement of the driving clutch K by which the constantly rotating driving shaft L is coupled to the shaft M which actuates the mechanism by which the completed roll or bundle of coins is seized and carried to the wrapping mechanism and the latter is caused to wrap the paper around the bundle of coins and to close the wrapper, and the wrapped bundle is finally discharged.

The escapement lever E, Figs. 4, 6, 9, 10, 11, 12 and 19, is provided with a head 80 which moves up and down in the lower part of the coin chute. The feed lever F is provided with a head 81 which moves forwardly and backwardly in the packing chamber 82 into which the lower end of the coin chute opens. When the escapement lever E is in its lower position the feed lever F is in its retracted or initial position, see Fig. 9. The row of coins in the chute rests against the head 80 of the escapement lever and the coin 83, which has been released, takes its position in the packing chamber in front of the head 81 of the feed lever F and behind the counting lever I. The forward or feeding movement of the head 81 drives this coin forwardly in the packing chamber and at the same time the escapement lever E moves upwardly and releases the column of coins in the chute. The column now descends until it rests upon the head 81 of the feed lever, Fig. 10. When the feed lever F has completed its forward movement, the coin in the packing chamber rests against the wall 84 of the latter, as shown by dotted lines in Fig. 10. The feed lever now moves backward, the succeeding coin resting on the top of the feed lever and against the abutment roller 85. At the moment when the feed lever passes from underneath the foremost coin, the head 80 of the escapement lever E is pressing on the top of said coin and forces it down to the bottom of the chute and holds it there momentarily, at the same time retaining the next succeeding coin immediately in the rear in the upper part of the chute. The feed lever F completes its stroke and commences the forward stroke and the head of the escapement lever releases the coin in the bottom of the chute. The feed lever then pushes the coin forward to the packing position.

The escapement lever E, Figs. 11 and 12, is mounted on the main frame by a pivot 90 and is operated from an elbow lever 91, also mounted on said pivot by a connecting spiral spring 92, or other yielding connection, so that, if the escapement lever should strike upon a jammed coin, which the lever is unable to move downwardly, the spring will allow the actuating lever 91 to perform its normal movement and the escapement lever will move up and down as far as the jammed coin permits, whereby breakage is prevented. The feed lever F is pivoted to the man frame at 93, on the rear side thereof, and its head 81, which moves back and forth in the packing chamber on the front side of the frame, is connected with the body of the lever by a neck 94 which moves in a slot 95 in the frame.
The feed chamber is formed in the rear side of a cover plate 96, Figs. 1, 7, 9, 10, 11, 12, 13, 15 and 19, carrying the cradle bars 97 98 at the delivery end of the chamber. This cover plate is also provided on its rear side with a curved groove 99 coinciding with the curved slot 95 in the frame and is detachably secured to the latter by screws 100, or other means.

The elbow lever 91 is actuated from the feed lever F by a link 101 connecting the upper portion of the feed lever with the arm 102 of the elbow lever 91, Figs. 4, 6, 11 and 12. The other arm 103 of the elbow lever actuates an agitator 104, Figs. 1, 4, 6 and 9, which projects with its inner arm 105 into the coin hopper and agitates the coins in the same. The outer arm 106 of the agitator may be weighted to hold the agitator in an inoperative position when no coins are contained in the hopper. When coins are contained in the hopper they depress the inner arm of the agitator and hold the latter in its operating position, in which an arm 107 on the shaft 108 of the agitator is actuated by the arm 103 of the elbow lever.

The feed lever F, Figs. 1, 4, 5, 6 and 19, is actuated from the constantly rotating driving shaft L by means of an interposed actuating lever 110, which is pivoted concentrically with the feed lever. This actuating lever is oscillated from the shaft L by a link 111 connecting the lever with a crank pin 112 on a disk 113 secured to the shaft. The actuating lever engages the feed lever for the return stroke by a rigid connection, for instance, a set screw 114, and for the feed or forward stroke by a releasable connection or coupling, which consists, preferably, of a lever 115 and a spring 116. The coupling lever is pivoted on the actuating lever and bears with one arm against a pin or projection 117 on the feed lever, against which it is pressed by the spring 116 connected with its other arm.
In the normal position of the parts, shown in Figs. 4 and 6, the coupling lever transmits the feed movement from the actuating lever 110 to the feed lever, and the screw 114 transmits the return movement. If the feed lever on its feed stroke should be arrested by a jammed coin, the actuating lever will continue its feed stroke and the coupling lever will be turned until it has passed the dead center, as shown in Fig. 5.
The spring now disengages the coupling lever from the feed lever and the parts remain in this inoperative position, in which the oscillations of the actuating lever produce no movement of the feed lever and the feeding of coins ceases. When this has occurred the operator relieves the jammed coin and then turns the coupling lever back to its operative position, when the operation of feeding coins will be resumed.
The counting mechanism, shown most clearly in Figs. 6, 9, 10 and 11, is constructed as follows: The horizontal counting lever I, pivoted to a bracket 120 on the rear side of the main frame, extends across the packing chamber so as to be operated by each coin as it passes to the packing position. This lever actuates a horizontal ratchet wheel 121 by means of a pawl 122, detent 123 and interposed spring 124, which latter holds both the pawl and the detent in engagement with the ratchet wheel. The pawl 122 lies with its head between the wheel and a pin 125 affixed to the bracket 120 on the main frame, which pin maintains the engagement of the pawl with the wheel while the coin is in contact with the counting lever and prevents the pawl from leaving the wheel until the coin has cleared the counting lever. The ratchet wheel is secured to the lower end of the vertical shaft 126 of the counting mechanism, which shaft carries at its upper end a pointer 127 moving over a dial 128 upon the top of the casing 129. The ratchet wheel is provided on its lower side with a cam 130 having an abrupt face 131 which controls the clutch K. This face or shoulder corresponds with the position of the pointer so that when the latter reaches on the dial the number corresponding with the number of coins to be assembled, the clutch will be thrown by the cam into engagement.

The movable member 135 of the clutch, Figs. 6, 19 and 20, is engaged with the other clutch member 136 by a shifting lever 137 which is shifted by a transverse rod 138. The latter is provided at its opposite end with a notch 139 which engages a fixed stop 140 on a bracket 141 secured to the main frame. This shifting rod is engaged with this stop for holding the clutch in the released position and is disengaged from this stop for throwing the clutch into the engaged position. This movement of the clutch is effected by a spring 142 connecting with the shifting lever 137. The shifting rod 138 is released from the stop 140 when the abrupt face of the releasing cam 130 reaches the predetermined position, and this releasing movement is effected by a releasing rod 143 which lifts the shifting rod from the stop 140, and by a lever 144 to which the upper end of this rod is attached and which is held against the releasing cam 130 by a spring 145. The ratchet wheel and its cam are turned a step forwardly by each coin, the cam depresses the lever 144 correspondingly for each coin, and strains the spring 145 accordingly, until the entire movement of the lever 144 has been effected by the cam. The releasing rod 143 is provided with an upright notch 146 into which extends a projection 147 on the shifting rod 138. This notch is sufficiently long to permit of this step by step downward movement of the rod 143. When the releasing cam 130 has reached the releasing position, which occurs when the coin completing the bundle has been packed, the lever 144 is raised to its initial position by the spring 145, thereby raising the releasing rod 143. The last portion of the upward movement of this rod causes the lower end of its notch 146 to engage the projection 147 of the shifting rod and to lift the latter from the stop 140, thereby permitting the clutch to be thrown by the spring 142.

It will be seen from the foregoing that each coin which is fed forward and counted performs its share of the work in straining the releasing spring 145 for throwing the clutch. The work of straining the spring is in this manner distributed over all the coins which constitute a bundle and is not all thrown upon the last coin of the bundle, which heretofore has been the practice and has rendered the work of throwing the clutch hard and difficult to perform and liable to deface the last coin of each bundle.

The packing mechanism, best shown in Figs. 6, 9, 10, 11 and 14, is constructed as follows: Each coin as it reaches the delivery end of the packing chamber is pushed by the packer G transversely or flatwise upon the cradle or support, formed by the transverse bars 97 98, and against an abutment or follower 150 which yields in the longitudinal direction of the cradle bars with every coin packed upon the same. The follower slides upon the cradle bars and is pressed toward the packer by any suitable device, for instance, a spring 151 which connects with a pivoted arm 152 bearing against the follower, see Figs. 8, 11 and 19. The follower can be readily moved by hand away from the bundle, if desired, for instance, for placing bent coins on the cradle by hand. The cover plate 96 to which the cradle bars are secured is constructed for a certain size of coin and is replaced by another plate for a different size of coin. The packer G comprises a head 153 which is attached to a depending lever 154 pivoted to the main frame at its upper end and held with its lower end against a cam 155 on the disk 113 on the main shaft L by a spring 156 which bears against the head 153 and is mounted upon a bolt 157 secured to the main frame. The cam 155 is so shaped that it permits the spring to move the lever 154 and the packer attached thereto sidewise, toward the follower 150, and push the coin which has been counted and has taken its position at the delivery end of the packing chamber upon the cradle bars. The cam further moves the packer back to its initial position after the packing movement has been completed. This return movement of the packer is effected positively by the cam but the packing movement is effected by the spring, so that, in case the packer should strike an obstruction by an imperfection in the feeding of the coins, or otherwise, the packer can remain behind without following the cam. The packer head 153 is preferably provided with two packing pins or projections 158 projecting from the head toward the follower and adapted to bear against the flat side of the coin which is being packed. The packer head is arranged on the rear side of the main frame and the packer pins extend through openings in said frame in which they are guided. The return of the packed coin with the packer is prevented by two detent springs 160 161 which are arranged with their free ends adjacent to the packer, the upper spring 160 being secured to the upper portion of the coin chute and the lower spring 161 to the cover plate 96, see Figs. 7, 9, 10 and 14. The end portions of these springs converge toward the follower and are so positioned that the coin, in being moved upon the cradle by the packer between these springs, spreads their ends and the latter, after the coin has passed beyond the springs, return to their normal position and prevent backward movement of the coin. The converging ends of the springs also serve to keep the coin in an upright position in the delivery portion of the packing chamber. As the coins are pushed upon the cradle bars by the packer they are pressed down upon the cradle bars by a pivoted presser 162, Figs 1, 14 and 15, which is pressed downwardly by a spring 163, the downward movement of the bar being limited by a stop 164. This bar may be attached to the upper part of the coin chute, as shown, and alines the coins on the cradle so that they stand evenly side by side.

The gripping mechanism seizes the bundle of coins assembled on the cradle or support, removes the bundle from the latter, carries the bundle to the wrapping mechanism, and controls the bundle until the wrapping is completed. This gripping mechanism, as well as the wrapping and paper feeding mechanisms, are operated from an oblique counter shaft M which is driven intermittently from the constantly rotating main shaft L by the clutch K, which latter, when engaged, drives a spiral gear wheel 171 meshing with a spiral gear wheel 172 on the lower portion of the counter shaft M. The gripping, wrapping and paper feeding mechanisms are all driven from this counter shaft and as the latter is uncoupled from the main driving shaft L while the feeding and counting of coins is proceeding in assembling a bundle, all of these mechanisms are at rest during this assembling operation and are started by the engagement of the clutch when the bundle of coins has been assembled on the cradle.

173 represents a secondary driving shaft which is rotated intermittently and driven from the counter shaft M by a pair of spiral gear wheels 174 175.

The gripping mechanism is best represented in Figs. 6, 15, 16, 17, 18, 23–26 and is constructed as follows: 180 and 181 represent the grippers which are loosely mounted upon a transverse rock shaft 182 so as to be capable of a rocking and a sliding movement thereon. The head or free end of each gripper is adapted to bear against the end of the bundle of coins and is preferably provided with a bearing pin for that purpose, the gripper 180 having a pin 183 and the gripper 181 a pin 184, Figs. 23 and 24. The grippers stand normally in line with the axis of the bundle on the cradle, the gripper pin 183 standing adjacent to the packer head 153 which is recessed to make room for this pin, as represented in Figs. 6 and 14, while the gripper pin 184 stands adjacent to the follower 150 which is shaped to clear the gripper pin 184. The grippers stand normally so far apart that their pins do not touch the completed bundle of coins on the cradle, see Fig. 23. When the bundle has been completed the grippers are moved toward each other so as to grip the ends of the bundle, Fig. 24, the ends of the gripper pins being preferably faced with leather, or other suitable material. When the grippers have seized the bundle they are rocked on the rock shaft 182 to remove the bundle from the cradle and carry the bundle to the wrapping position. 185 is a duplex cam which is provided with two oppositely inclined slots or faces 186 in which engage pins or projections 187 on the grippers. This cam or nut is secured to the rock shaft 182 which receives its rocking movement by a cam 188 on the secondary driving shaft 173. This cam engages an arm 189 on the rock shaft 182, Figs. 15–18, which arm is held against the cam by a spring 190. The rocking movement of the duplex cam or nut 188 causes the grippers to move lengthwise on the shaft toward or from each other, such movement being produced by the action of the oppositely inclined spiral slots of the cam or nut 188 upon the projections of the grippers which engage in these slots. The grippers are steadied by a longitudinal connecting rod 191 which is secured to one of the grippers and has a sliding connection with a socket 192 on the other gripper. The rocking movement of the grippers is controlled by a cam 193 preferably formed on the same disk on which the cam 188 is formed. The cam 193 engages an arm 194 on the gripper 181, which arm is held against this cam by the spring 190.

In the initial position of the grippers, represented in Figs. 6, 15 and 23, the arm 189 of the rock shaft 182 rests against the heel of the opening cam 188. As soon as this cam begins to rotate in the direction of the arrow this cam releases this arm and the spring 190 rocks the shaft 182 in the direction of the arrow, Fig. 16, and this rocking movement of the shaft and the duplex cam 185 causes the grippers to quickly approach each other and grip the bundle of coins on the cradle, Fig. 24. The rotation of the cam 193, which engages by its abrupt face 195 the arm 194 on the gripper 181, rocks both grippers on the shaft 182, after the grippers have been so closed, and swings the grippers from their initial position to the wrapping position, Figs. 18 and 26. This rocking movement of the grippers places the arm 189 in the path of the opening cam 188, as shown in dotted lines in Fig. 18, the movement being partly performed in the position shown in Fig. 17. The arm 194 rides on the concentric face 196 of the cam 193 and the grippers are held in the wrapping position until the rear end of the concentric face reaches the arm. 194. During the latter portion of this period the opening cam 188 engages the arm 189 of the rock shaft 182 and turns the latter in the reverse direction in which the rocking movement of the duplex cam 185 moves the grippers away from each other, whereby the bundle is released. The grippers are returned from the wrapping position to the initial position by a returning lever 200 mounted on a pivot 201 which is secured to the main frame. This lever is actuated by a pin 202 secured to the disk on which the cams 188 and 193 are formed. This pin strikes the lower arm of the lever 200 after the grippers have been opened, as described, and the upper arm of this lever engages the arm 194 of the gripper 181 and rocks the grippers on the rock shaft back to the initial position. The duplex cam centers the grippers and through the latter the bundle with reference to the paper and the wrapping rolls.

The paper feeding mechanism is constructed as follows: O represents the paper holder in which the roll of paper 210 rests and from which the web 211 of paper passes upwardly to the feed rolls 212 213 and then downwardly in front of the cutter plate 214 on which the depending end portion of the web is confined by upright curved guide bars 215. The paper holder O is preferably, as shown, an open-topped receptacle in which the roll of paper turns as the web is unwound. The roll 212, around which the web of paper passes, guides the web and is preferably provided with flanges, as shown. This roll is journaled in fixed bearings 216, Figs. 36 and 37, while the roll 213 is mounted in movable bearings 217 which are acted upon by springs 218 by which the roll 213 is passed toward the roll 212. A releasing eccentric 219 is arranged between the pair of bearings on one side of the two rolls for throwing the rolls apart and releasing the web, when desired. The shafts of the two paper feed rolls are connected by a pair of gear wheels 220 and the shaft of the roll 212 is driven from an oblique shaft 221 by a pair of spiral gear wheels 222 223. The cutter plate 214 is provided with side flanges for guiding the web and the lower edge 224 of this plate is V-shaped or otherwise so constructed as to cut the web when the latter is pressed against the edge by a pull in a backward direction. The curved confining bars 215 are secured to a cross bar 225 which is secured to a cross bar 226 of the main frame. The paper holder, as shown, has its bottom formed by two downwardly converging bars or plates 227 228 upon which the roll of paper rests and which are separated by an opening or throat 229 through which the web of paper passes from the roll downwardly to and around the rounded edge portion 229ª of the plate 227. These bottom plates are so shaped or curved that the supporting surfaces for the roll become gradually steeper toward the delivery opening or throat in order that the roll of paper may wedge more tightly between the converging walls of the bottom as the roll becomes smaller and lighter, as indicated by dotted lines in Fig. 39, thereby compensating for the gradual decrease of the weight of the roll as the paper is paid out and maintaining a practically uniform tension on the web.

The wrapping mechanism is constructed as follows, see Figs. 6, 15, 25–31: 230 and 231 are two wrapping rolls which are journaled in bearings formed in or secured to the main frame and 232 is a wrapping roll which is movable toward and from the rolls 230 and 231. In the initial position, shown in Figs. 6, 15 and 25, the movable wrapping roll 232 stands at a distance forwardly of the stationary rolls 230 and 231. This movable roll is mounted on a suitable swinging support or frame which carries a tucker or concave receiver 234 above this roll. The swinging support on which the movable rolls and the tucker are mounted, as shown, is formed by the delivery chute 235. The tucker, Figs. 6, 25, 26 and 29, is a skeleton frame of sheet metal having the form of a cylinder segment and provided with end lugs 236 which are hung upon a transverse pivot rod 237 secured between the upper portions of the chute 235. A spring 238 applied to the pivot rod is so connected with the tucker as to hold the latter in its receiving position, with the concave side turned forwardly, or toward the cradle. The roll 232 is provided with a central annular groove 239 for accommodating the central bar of the tucker when the latter is reversed. The tucker is provided with side flanges 240 for confining the paper against sidewise displacement. In the initial position of the movable roll the tucker stands above this roll and below the cutter plate 214 and the depending portion 241 of the web of paper extends from the plate downwardly in front of the tucker and movable roll, as shown by dotted lines in Fig. 25. As the grippers carry the bundle backwardly from the cradle to the wrapping mechanism the bundle comes in contact with this depending portion of the paper and tucks the same into the tucker, in which the bundle takes its position, as shown in full lines in said figure, the tucker wrapping the paper partially around the bundle. The further rearward movement of the grippers carries the paper, the bundle and the tucker backwardly and also turns the tucker backwardly about its pivot rod 237. At the same time the roll 232 is moved backwardly by its swinging support. The direction of these rearward movements is indicated by the dotted arrows in Fig. 25. When the movable roll has reached its rearmost position, shown in Fig. 26, the tucker has been reversed, presenting its concave side rearwardly, the bundle is partially inclosed by the paper which lies against the opposing faces of the three rolls, and the movable roll is exerting pressure upon the bundle and presses the same against the stationary rolls 230 and 231. The latter are driven, while the movable roll 232 is not driven and is a pressure roll. The bundle is now rotated by the rotation of the rolls, the bundle being held between the grippers, and the paper is wrapped around the bundle. The rotary movement of the bundle is faster than the feed movement of the paper and therefore takes up the slack of the paper and finally strains the paper and draws it against the cutting edge of the cutter plate with sufficient force to sever the paper. The width of the paper exceeds the length of the bundle sufficiently to permit the end portions of the paper to be curled or crimped against the ends of the bundle of coin in the usual manner. This curling or crimping is effected by two crimpers 242 which are secured to shoes 243, slidably mounted upon a cross bar 244 of the main frame. When the crimping has been completed the movable roll 232 is swung back to its initial position. This releases the completed bundle and the latter drops upon the delivery chute 235 from which it passes to a suitable receptacle. When the handle has been discharged from the rolls the tucker spring returns the tucker to its normal position.

The swinging support of the movable roll 232 is preferably operated by the following mechanism: 250 is a transverse arbor upon which the support or chute 235 is loosely mounted by lugs 251. 252 represents a rocking frame which is also loosely mounted upon this arbor and which connects with its arm 253 with the support 235. This rocking frame is provided on one side of the machine with an actuating arm 254 which is provided with a roll 255. 256 is the actuating cam which engages this roll and which has a peripheral lug 257 and a concentric face 258. In the initial position of the pressure roll, Fig. 25, the cam roll 255 rests on the lug 257. As the cam 256 begins to rotate the roll descends nearly to the concentric face 258 of the cam and this causes the support 235 to swing backwardly to the wrapping position, Fig. 26. The roll 255 remains in this position while the wrapping and crimping operations are being performed and when these have been finished the inclined front face of the lug 257 reaches the roll 255 and moves the latter and the arm 254 in the proper direction for returning the support 235 and the movable roll and tucker thereon to the initial position. Pressure is applied to the support 235 and the movable roll by a spring 260 which engages a U-shaped lever which is journaled in the main frame and which comprises an outer arm 261 to which the spring is attached and an inner arm 262. The pivotal portion of this lever connecting the two arms is journaled in the main frame, Figs. 4, 25-28. The inner arm 262 of this pressure lever engages a roll 263 on the actuating arm 254 of the rocking frame 252 and presses the support 235 in the direction in which the movable roll 232 exerts pressure upon the bundle. The same spring pressure also tends to hold the cam roll 255 in the position in which it is engaged by the cam. The rocking frame 252 moves in unison with the rocking support 235 and is employed in order to enable the chute and the pressure roll 232 to adapt themselves to inequalities in the bundle which is being wrapped, and to enable the pressure roll to bear along its entire length against the bundle. For this purpose the rocking frame 252 connects with the chute at the middle thereof and the connection is sufficiently loose to permit of this adjustability. The leverage by which the spring presses the pressure roll against the bundle is small at the beginning of the movement and increases greatly as the bundle approaches the driven rolls and is very stiff while the bundle is being rotated and wrapped. The rocking movement of the grippers in carrying the bundle from the cradle to the wrapping rolls is slow at first in order to make sure that the bundle is removed from the cradle and accelerates quickly. The cam 256 is secured to the secondary driving shaft 173. The rolls 230 and 231 are driven from the counter shaft M which is provided with a spiral gear wheel 270 for the purpose, Figs. 1 and 35. This wheel meshes with a spiral gear wheel 271 carrying on its side a master spur gear 272 which meshes with pinions 273 on the shafts of the rolls 230 and 231. The shaft 274 of the upper roller 231 is geared with the oblique shaft 221 of the paper feed mechanism by spiral gear wheels 275 and 276, Fig. 6.

The paper feed mechanism is preferably so proportioned that the length of paper which is fed out at a time is about twice as long as the circumference of the bundle, and is so timed that this length of paper is fed out while the wrapping and crimping of a bundle is being performed, so that the necessary length of paper has been fed out and is ready for the next bundle when the grippers and the pressure roll have been returned to their initial position and the movement of the paper feed mechanism ceases. The crimpers 241 are pressed toward each other by a spring 280 and are moved away from each other by cams 281 on the secondary driving shaft 173. These cams operate upon two levers 282 which are pivoted to sleeves 283 on the arbor 250. The upper ends of these levers are connected with the crimper shoes 243 and the spring 280 connects the upper portions of these levers, Figs. 15, 25 and 27. Each crimper 241 consists of a curled or hooked rod or wire of round cross section projecting inwardly which is secured to a shoe slidably mounted on the cross bar 241. The round form of this curled rod secures considerable freedom of movement to the paper in being crimped and enables the crimpers to disengage themselves readily from the finished bundle.

It has already been described how the movable clutch member 135 is thrown into engagement with the opposing clutch member 136 when the last coin of a bundle has been packed and how the clutch then drives the oblique counter shaft M and through the same the gripping, wrapping and paper feeding mechanisms. The operation of wrapping a bundle is effected during one revolution of the secondary driving shaft 173 and when that revolution is completed the clutch is disengaged and the gripping, wrapping and paper feeding mechanisms stop and remain at rest until the next bundle is completed.

The mechanism by which the clutch is disengaged is best shown in Figs. 6, 19, 20–22 and is constructed as follows: Underneath the shifting lever 137 the shifting rod 138 is supported in a guide 290 secured to a bracket 291 on the frame. The shifting rod is provided with a pivot pin 292 on which the lever may rock. The lever is provided at its lower end with a roll 293 which engages an annular flange 294 on the side of the gear wheel 175 by which the secondary driving shaft receives its motion. This flange has a notch 295 into which the roll 293 is drawn by the spring 142 for disengaging the clutch. The upper end of the shifting lever stands opposite a stop or stud 296 projecting laterally from the main frame. The bracket 291 is provided with a guide 297 which engages over the lower portion of the shifting lever and prevents displacement thereof. When the shifting rod 138 is disengaged from the stop 140 upon the completion of the bundle, as described, the shifting lever 137 rests with its roll 293 in the notch 295 of the annular flange 294 and the lever is turned by the spring 142 on the roll 293 as a fulcrum, the wheel 175 being at rest at this time. This movement of the lever throws the movable clutch member 135 into engagement with the opposing clutch member 136 and also throws the upper end of the lever against the stop 296. The wheel 175 now begins to rotate and this causes the roll 293 to rise out of the notch 295 and engage against the face of the annular flange or cam 294. This cam, in forcing the roller 293 at the lower end of the lever out of the notch rocks the lever on the stud 296 at the upper end of the lever as a fulcrum and the rocking movement so produced in the lever is sufficient to move the shifting rod 138 far enough to engage it with its stop 140, but not far enough to release the movable clutch member 135 from the opposing member 136. The parts remain in this position during the remainder of the revolution of the wheel 175. When this revolution is completed the roll 293 of the shifting lever is drawn into the notch 295 by the spring 142 and the lever is thereby rocked on the pivot 292 of the shifting rod, which pivot is now fixed, as the rod has been locked to its stop 140. This rocking movement of the lever disengages the movable part 135 of the clutch from the opposing part and this stops the counter shaft M and the gripping, wrapping and paper feeding mechanisms driven therefrom. It will thus be seen that the shifting lever 137 turns on three different fulcra, which are the roll at its lower end, for engaging the clutch, the stud opposite its upper end for moving the shifting rod back to its locked position, and the pivot on the shifting rod for disengaging the clutch.

The various parts of the machine are removable and adjustable so that the machine can be readily adapted to operate upon coins of different sizes. It is advisable to take the rear edge 300, Fig. 3, of the paper, nearest the vertical plane of the coin chute, as the master line from which all transverse adjustments are made which may be necessary to adapt the machine for handling bundles of different lengths.

As described, the main driving shaft runs constantly and the feeding of the coins to the counting and packing mechanisms proceeds without interruption, while the wrapping and paper feeding mechanisms are operated intermittently and are in operation only while a bundle is being wrapped and then remain at rest until the next bundle is ready to be wrapped.

The wrapping rolls which are driven from the pinion 272 secured to the spiral gear 271, Figs. 27 and 35, as described, make about thirty revolutions in wrapping a bundle. The pitch circle of this pinion 272 has the diameter of the coin operated upon and as this pinion drives not only the wrapping rolls but also the paper feeding rolls 212, the length of paper which is fed out and the wrapping which is effected are rendered proportionate to the size of the coin. If the machine is to be changed for a smaller or larger coin this pinion is replaced by a correspondingly larger or smaller pinion, and for the sake of convenience each of these pinions is provided with a spiral gear 271 so that the substitution can be quickly made. It is, of course, obvious that instead of making the diameter of the pinion 272 equal to that of the coin, the diameter of the pinion may bear some other definite relation to the diameter of the coin, in which case the diameters of the rolls are suitably proportioned to produce the same effect.

I claim as my invention:

1. The combination of a coin-feeding device, a coin support upon which the coins are assembled side by side, a packer by which the coins are pushed upon said support, a yielding abutment against which the coins are packed, a spring by which the packer is pressed toward said abutment, and a cam by which the packing movement of the packer is controlled and the return movement of the packer is effected, substantially as set forth.

2. The combination of a coin chute provided with an escapement device, a packing chamber receiving the released coins from said chute, a feeding lever operating in said chamber, a packer operating transversely to the packing chamber, a support upon which the coins are packed, and detent springs secured, respectively, to said chute and said packing chamber, substantially as set forth.

3. The combination with the wrapping rolls mounted in stationary bearings, of a pressure roll, a movable support for the same by which the pressure roll is moved toward and from the opposing rolls, and a rocking actuating device for said movable support connected therewith midway between the ends of said pressure roll and permitting the latter to aline itself to the opposing rolls, substantially as set forth.

4. The combination with the bundle forming mechanism, the counting mechanism and the bundle wrapping mechanism, of a constantly rotating driving shaft, a clutch by which the wrapping mechanism is intermittently actuated from said driving shaft, and a clutch-engaging mechanism which is controlled by said counting mechanism and which comprises a shifting lever which is adapted to rock on three different fulcra, substantially as set forth.

5. The combination with the bundle forming mechanism, the counting mechanism and the bundle wrapping mechanism, of a constantly rotating driving shaft, a clutch by which the wrapping mechanism is intermittently actuated from said driving shaft, a clutch-engaging mechanism which is controlled by said counting mechanism and which comprises a cam actuated by the counting mechanism, a releasing rod controlled by said cam, a shifting rod, a lock from which said shifting rod is released by said releasing rod, and a shifting lever actuated by said shifting rod and connected with said clutch, substantially as set forth.

6. The combination with the bundle forming mechanism, the counting mechanism and the bundle wrapping mechanism, of a constantly rotating driving shaft, a clutch by which the wrapping mechanism is intermittently actuated from said driving shaft, a clutch-engaging mechanism which is controlled by said counting mechanism and which comprises a cam actuated by the counting mechanism, a releasing rod controlled by said cam, a shifting rod, a lock from which said shifting rod is released by said releasing rod, and a shifting lever connected with said clutch and having a pivotal connection with said shifting rod on which said lever rocks in disengaging the clutch, substantially as set forth.

7. The combination with the bundle forming mechanism, the counting mechanism and the bundle wrapping mechanism, of a constantly rotating driving shaft, a clutch by which the wrapping mechanism is intermittently actuated from said driving shaft, a clutch-engaging mechanism which is controlled by said counting mechanism and which comprises a cam actuated by the counting mechanism, a releasing rod controlled by said cam, a shifting rod, a lock from which said shifting rod is released by said releasing rod, a shifting lever connected with said clutch, a fulcrum on which said lever rocks in engaging the clutch when said shifting rod is released, a fulcrum on which said lever rocks for again engaging the shifting rod with its lock, and a fulcrum connecting said lever with the shifting rod and on which the lever rocks in disengaging the clutch, substantially as set forth.

Witness my hand in the presence of two subscribing witnesses.

FREDERICK HART.

Witnesses:
F. E. HART,
M. RELF.

It is hereby certified that in Letters Patent No. 1,038,361, granted September 10, 1912, upon the application of Frederick Hart, of Poughkeepsie, New York, for an improvement in "Machines for Wrapping Coins," errors appear in the printed specification requiring correction as follows: Page 3, line 44, for the word "man" read *main;* page 6, line 51, for the word "passed" read *pressed;* page 7, line 43, for the word "handle" read *bundle;* and that the said Letters Patent should be read with these corrections therein that the same may conform to the record of the case in the Patent Office.

Signed and sealed this 8th day of October, A. D., 1912.

[SEAL.]

C. C. BILLINGS,

*Acting Commissioner of Patents.*